US012561341B2

(12) United States Patent
Bourbonnais et al.

(10) Patent No.: US 12,561,341 B2
(45) Date of Patent: Feb. 24, 2026

(54) REAL-TIME REPLICATION OF DATABASE MANAGEMENT SYSTEM TRANSACTIONS INTO A DATA LAKEHOUSE

(71) Applicant: International Business Machines Corporation, Armonk, NY (US)

(72) Inventors: Serge Bourbonnais, Palo Alto, CA (US); Austin Franky Manuel D'costa, Beaverton, OR (US); Weiqiang Zhuang, San Jose, CA (US); Swaminathan Sundararaman, San Jose, CA (US); Daniel Waddington, Morgan Hill, CA (US); Saransh Gupta, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/679,600

(22) Filed: May 31, 2024

(65) Prior Publication Data

US 2025/0371029 A1 Dec. 4, 2025

(51) Int. Cl.
*G06F 16/27* (2019.01)
*G06F 16/23* (2019.01)

(52) U.S. Cl.
CPC ........ *G06F 16/273* (2019.01); *G06F 16/2379* (2019.01)

(58) Field of Classification Search
CPC ............................ G06F 16/273; G06F 16/2379
USPC ........................................................ 707/615
See application file for complete search history.

(56) References Cited

U.S. PATENT DOCUMENTS

| | | | |
|---|---|---|---|
| 7,490,083 | B2 | 2/2009 | Bourbonnais et al. |
| 10,191,932 | B2 | 1/2019 | Lehouillier et al. |
| 10,860,612 | B2 | 12/2020 | Lee et al. |
| 11,308,119 | B2 | 4/2022 | Bourbonnais et al. |
| 12,050,582 | B1 * | 7/2024 | Aya ................... G06F 16/24573 |
| 12,153,597 | B1 * | 11/2024 | Maier .................. G06F 16/254 |
| 2022/0171791 | A1 | 6/2022 | Bourbonnais et al. |

(Continued)

OTHER PUBLICATIONS

Anonymous, "Apache Iceberg", URL: https://iceberg.apache.org, Retrieved: Apr. 23, 2024, 8 pages.

(Continued)

*Primary Examiner* — Robert W Beausoliel, Jr.
*Assistant Examiner* — Lauren Zannah Ganger
(74) *Attorney, Agent, or Firm* — CANTOR COLBURN LLP; Stephen Yoder

(57) ABSTRACT

A computing system performs real-time replication of database management system transactions. The computing system includes a source DBMS, a replication service and a data lakehouse. The source DBMS stores at least one source transaction table recording at least one source transaction and generates at least one recovery log indicating at least one modification in the at least one source transaction table. The replication service replicates the at least one source transaction recorded in the at least one source transaction table by generating at least one data file having a first data format. The data lakehouse stores at least one lakehouse table corresponding to the at least one source transaction table and having a second data format different from the first data format, and to modify the at least one lakehouse table based on the at least one data file.

20 Claims, 3 Drawing Sheets

(56) References Cited

U.S. PATENT DOCUMENTS

| | | |
|---|---|---|
| 2023/0066540 A1 | 3/2023 | Chen et al. |
| 2023/0098227 A1* | 3/2023 | Nadeau ............... G06F 16/2379 |
| | | 707/602 |
| 2024/0004902 A1 | 1/2024 | Bo et al. |
| 2024/0134748 A1* | 4/2024 | Somaiah ............... G06F 16/116 |

OTHER PUBLICATIONS

Gareth Eagar, "Chapter 14: Building Transactional Data Lakes", Data Engineering with AWS Second Edition, Jan. 10, 2023, 36 pages.

Gareth Eagar, "Chapter 2: Data Management Architectures for Analytics", Data Engineering with AWS Second Edition, Jan. 10, 2023, 32 pages.

Gareth Eagar, "Chapter 5: Architecting Data Engineering Pipelines", Data Engineering with AWS Second Edition, Jan. 10, 2023, 24 pages, doi: https://soclibrary.futa.edu.ng/books/Data%20Engineering%20with%20AWS%20Acquire%20the%20skills%20to%20design%20and%20build%20AWS-based%20data%20transformation%20pipelines%20like%20a%20pro%20(Eagar,%20Gareth)%20(Z-Library).pdf.

Gareth Eagar, "Chapter 6: Ingesting Batch and Streaming Data", Data Engineering with AWS Second Edition, Jan. 10, 2023, 36 pages.

Gareth Eagar, "Chapter 9: A Deeper Dive into Data Marts and Amazon Redshift", Data Engineering with AWS Second Edition, Jan. 10, 2023, 40 pages.

International Searching Authority, "Notification of Transmittal of the International Search Report and the Written Opinion of the International Searching Authority, or Declaration," Patent Cooperation Treaty, Sep. 4, 2025, 14 pages, International Application No. PCT/IB2025/054762.

Mariusz Kujawski, "Data Lakehouse vs Data Warehouse vs Data Lake—Comparison of data platforms", Medium, Jul. 24, 2023, 19 pages, doi: https://medium.com/@mariusz_kujawski/data-warehouse-data-lake-and-data-lakehouse-comparison-of-data-platforms-842f0288b71.

Schipers et al., "Choosing an open table format for your transactional data lake on AWS", AWS Big Data Blog, Jun. 9, 2023, 23 pages, doi: https://aws.amazon.com/blogs/big-data/choosing-an-open-table-format-for-your- transactional-data-lake-on-aws/.

Siciliani Vincenzo, "Design and implementation of a real time data lake in cloud", Jan. 1, 2021, 83 pages, Retrieved from the Internet: https://webthesis.biblio.polito.it/sec ure/20576/1/tesi.pdf.

* cited by examiner

REAL-TIME REPLICATION OF DATABASE MANAGEMENT SYSTEM TRANSACTIONS INTO A DATA LAKEHOUSE

BACKGROUND

The present disclosure generally relates to data center environments, and more specifically, to a computing system capable of performing real-time replication of database management system transactions into a data lakehouse.

In today's data-driven landscape, organizations face the dual challenge of managing vast volumes of diverse data while extracting actionable insights to drive strategic decision-making. Data lakes and data warehouses emerge as complementary solutions, each serving distinct yet interconnected purposes. Data lakes provide a flexible repository for storing raw, unstructured, and semi-structured data from various sources, fostering data exploration, experimentation, and ingestion at scale. Conversely, data warehouses offer a structured environment optimized for fast querying, analysis, and reporting of structured data, ensuring data consistency, reliability, and business intelligence. Organization have attempted to establish a comprehensive data management strategy that accommodates the breadth and depth of modern data analytics requirements by leveraging the strengths of both data lakes and data warehouses to establish what is referred to as a "data lakehouse," or simply a "lakehouse."

SUMMARY

Embodiments of the present disclosure are directed to computer-implemented methods for providing real-time replication of database management system transactions into a data lakehouse.

According to a non-limiting embodiment, a computing system performs real-time replication of database management system transactions. The computing system includes a source DBMS, a replication service and a data lakehouse. The source DBMS stores at least one source transaction table recording at least one source transaction and generates at least one recovery log indicating at least one modification in the at least one source transaction table. The replication service replicates the at least one source transaction recorded in the at least one source transaction table by generating at least one data file having a first data format. The data lakehouse stores at least one lakehouse table corresponding to the at least one source transaction table and having a second data format different from the first data format, and to modify the at least one lakehouse table based on the at least one data file.

According to another non-limiting embodiment, a method of performing real-time replication of database management system transactions into a data lakehouse is provided. The method comprises storing in a source database management system (DBMS) at least one source transaction table recording at least one source transaction; and generating at least one recovery log indicating at least one modification in the at least one source transaction table. The method further comprises generating at least one data file having a first data format to replicate the at least one source transaction recorded in the at least one source transaction table; storing at least one lakehouse table corresponding to the at least one replicated source transaction table, the at least one lakehouse table having a second data format different from the first data format; and modifying the at least one lakehouse table based on the at least one data file.

According to yet another non-limiting embodiment, a computer program product is provided to perform real-time replication of database management system transactions into a data lakehouse is provided. The computer program product comprises a computer readable storage medium having program instructions embodied therewith, the program instructions executable by a processor to cause the processor to perform operations comprising: storing in a source database management system (DBMS) at least one source transaction table recording at least one source transaction; and generating at least one recovery log indicating at least one modification in the at least one source transaction table. The method further comprises generating at least one data file having a first data format to replicate the at least one source transaction recorded in the at least one source transaction table; storing at least one lakehouse table corresponding to the at least one replicated source transaction table, the at least one lakehouse table having a second data format different from the first data format; and modifying the at least one lakehouse table based on the at least one data file.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

DETAILED DESCRIPTION

Figure 1:
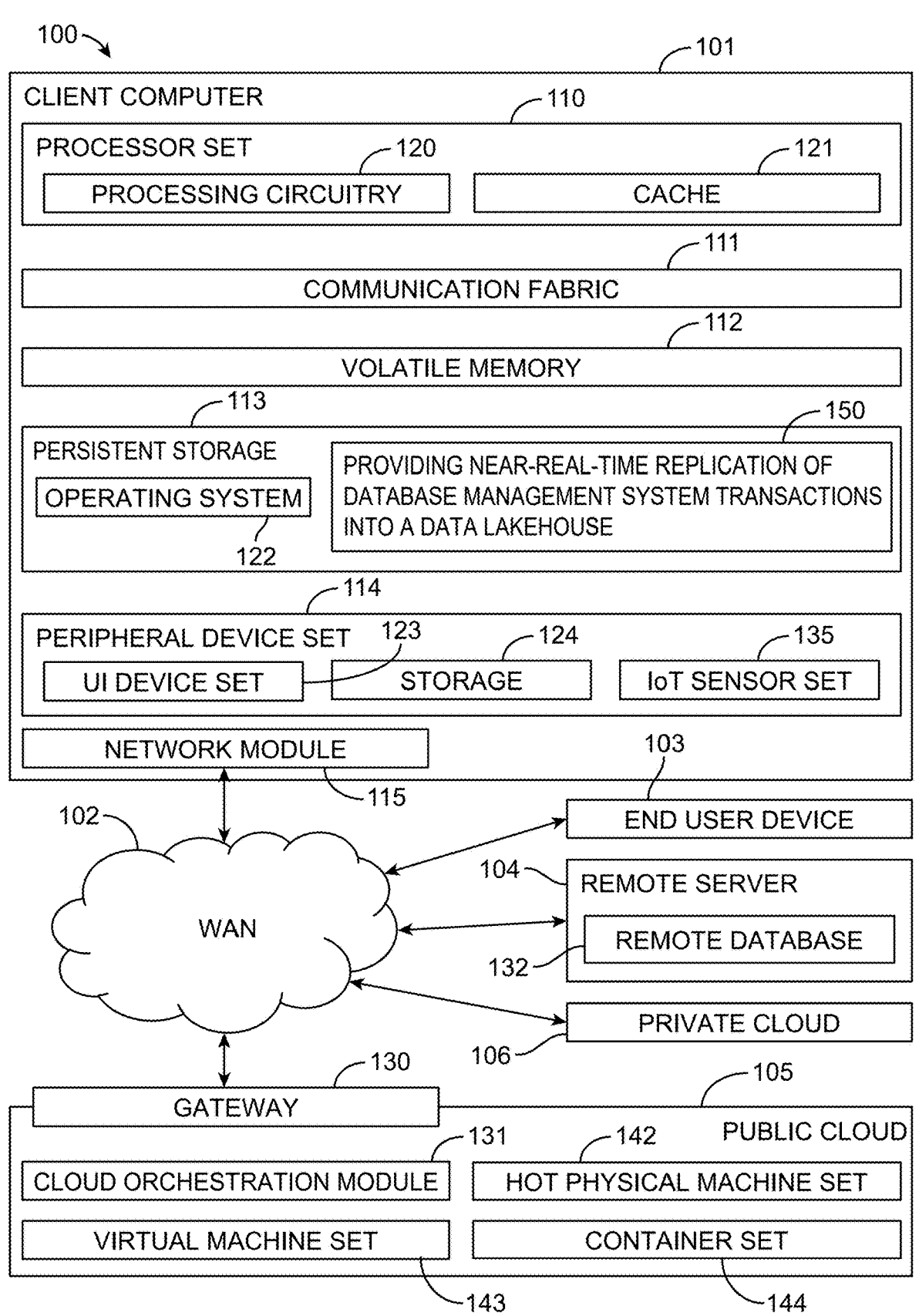
FIG. 1 depicts a block diagram of an example computer system for use in conjunction with one or more embodiments of the present disclosure.

A data lakehouse is facilitated using open data formats (e.g., Apache Parquet, Orc or Avro) and open table formats (e.g., Apache Iceberg, Hudi or Delta Lake) that leverage them. These formats allow for storing and retrieving large amounts of data that is accessible via open-source APIs. Data lakehouse storage is immutable, i.e., data cannot be updated in place, and it preserves all the previous versions of data until its garbage collected (e.g., aged out). Furthermore, it provides transaction durability and versioning for time travel.

The lakehouse paradigm aims to provide a method for centrally managing large volumes of data that can unify Online Transaction Processing (OLTP) and analytics workloads. OLTP involves real-time, or near real-time, transactional tasks like recording sales and managing inventory, optimized for high-throughput operations. Near real-time transactional tasks can be viewed as transactional tasks that are preformed according to asynchronous replication with no impact on source DBMS, etc. In at least one embodiment, near rea-time transactional tasks involves asynchronous replication, which is performed so it does not introduce any overhead on the source system that could affect its performance. An asynchronous process, for example, will lag behind, whereas a real-time process is synchronous and involve some from of 2 phase-commit processing between the source and target systems. By near real-time, the system described herein achieves as close as possible to real-time (simultaneous update of both source/target) and this delay is generally measure in seconds or fractions of a second, but may also reach minutes for some outlier cases.

Analytics workload encompasses tasks such as querying, reporting, and data analysis to derive insights for decision-making, often involving processing large volumes of data and performing complex analytical operations. In a data lakehouse architecture, OLTP systems handle transactional tasks, while analytics workloads leverage integrated data lake and data warehouse components for advanced analysis and data-driven decision-making.

For example, banking applications are OLTP systems that handle very high volumes of small transactions, tens of thousands of transactions per second or more, where each transaction might modify a single row. Unfortunately, updating a single row in a data lakehouse table is costly because it requires either writing many single-record files (i.e., Merge-on-Read mode) or rewriting entire files (Copy-on-Write mode). Moreover, lakehouses are not designed to support a large volume of transactions within a short interval. Batch processing is required to achieve a high rate of throughput (e.g., insert, delete) on open format data. The corresponding analytics systems on open table format need to integrate such OLTP data in real-time for functions such as fraud detection, machine learning, and other analytic functions that rely on live (or real-time data.

Conventionally, a data lakehouse aims to provide a single source of truth while avoiding unnecessary replication of data. However, in practice, there is a clear need to separate mission-critical OLTP services (e.g., bank transactions) from less critical OLTP analytics (e.g., fraud detection). Therefore, a method is needed to efficiently replicate transactions from a DBMS into a data lakehouse with a real-time latency while preserving source transaction time for time travel in the data lakehouse. The method must also provide transaction consistency with durability and resiliency in case of component failures.

The present inventive teachings provide a system and method that address the need to synchronize transactions in traditional OLTP systems (such as databases) with a data lakehouse in real-time. In exemplary embodiments, systems, methods, and computer program products for replicating transactions from any DBMS for which an ordered sequence of transactions that uniquely identifies each row changed can be produced, this includes but is not limited to Relational Database Management Systems (RDBMS).

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to FIG. 1, computing environment 100 capable of facilitating a system for providing real-time replication of database management system transactions into a data lakehouse is illustrated according to a non-limiting embodiment of the present disclosure. The computing environment 100 contains an example of an environment for the execution of at least some of the computer code involved in performing the inventive methods, such as real-time replication of database management system transactions in a data lakehouse as shown at block 150. In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer, a small single board computer (e.g. a Raspberry Pi) or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future.

In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages the sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after the instantiation of the VCE. Cloud orchestration module 131 manages the transfer and storage of images, deploys new instantiations of VCEs, and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community, or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

Figure 2:
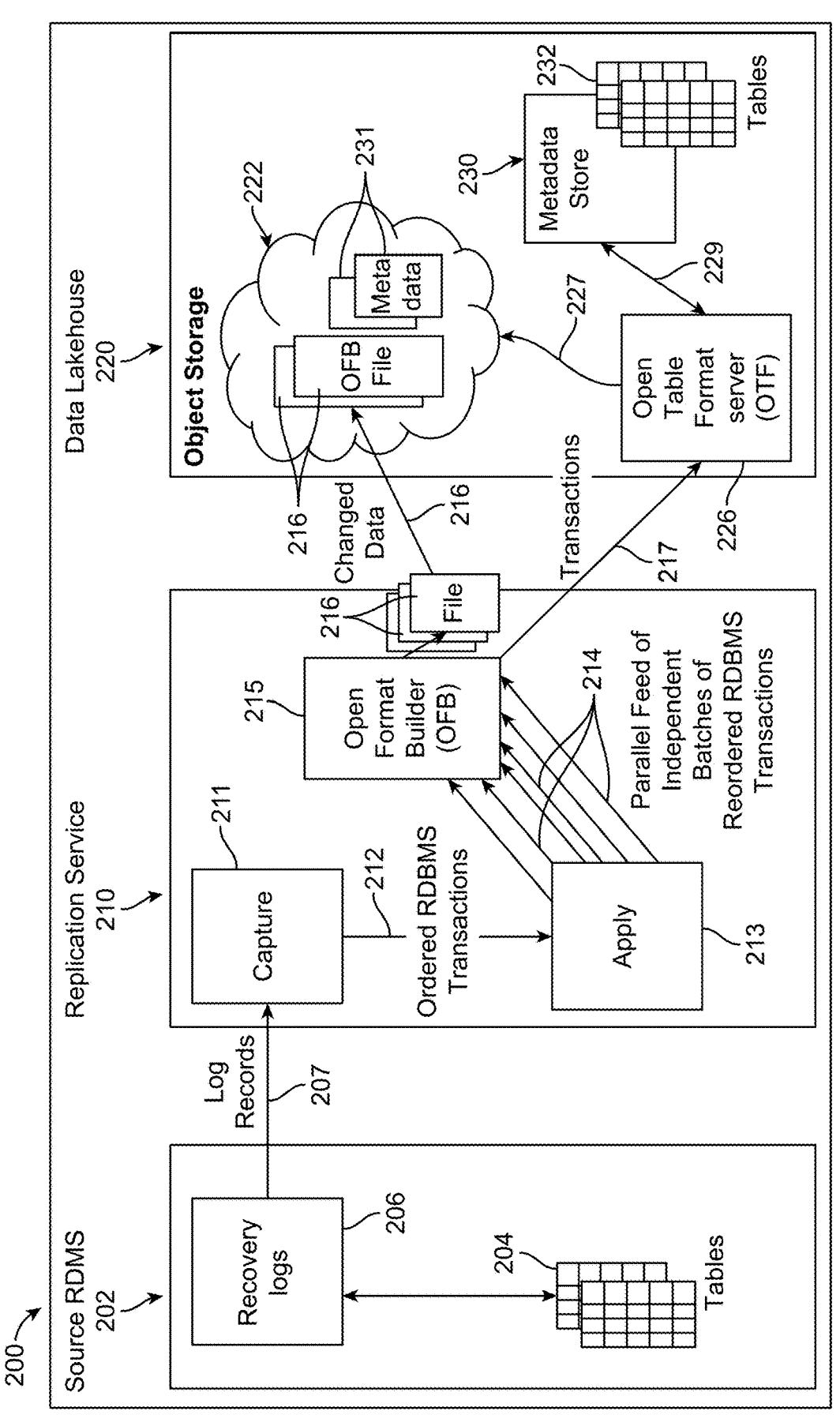
FIG. 2 is a block diagram illustrating a system for providing real-time replication of database management system transactions into a data lakehouse according to a non-limiting embodiment of the present disclosure.

Referring now to FIG. 2, a computing system 200 configured to perform real-time replication of database management system transactions into a data lakehouse is illustrated according to a non-limiting embodiment. The computing system 200 includes a source database management system (DBMS) 202, a replication service 210, and a data lakehouse 220. As described herein, the computing system 200 is capable of efficiently replicating relational database transactions, including online transaction processing (OLTP) database transaction, into a data lakehouse open data format that preserves source database transaction consistency for time travel and provides failure tolerance.

The source DBMS 202 can be established as a relational database management system (RDMS), for example, to provide mission-critical transactions. According to a non-limiting embodiment, the source DBMS 202 stores one or more source transaction tables 204 that track the source transactions processed from an ordered queue of the source DBMS 202 (e.g., the source DBMS transaction queue). The source DBMS 202 also records one or more log records (e.g., transaction records indicative of transactional changes or modifications in (e.g., changes in the rows of the source transaction tables 204) one or more source transactions) to generate at least one recovery log 206. The log records 207 included in the recovery log 206 can be output to generate a recovery log stream, which is delivered to the replication service 210.

The replication service 210 is configured to replicate the source transactions tracked in the source transaction tables 204 into the data lakehouse 220 in real-time. The replication service 210 includes a Capture module 211, an Apply module 213, and an open format builder (OFB) 215. Any one of the Capture module 211, the Apply module 213, and the OFB 215 can be constructed as an electronic hardware controller that includes memory and a processor configured to execute algorithms and computer-readable program instructions stored in the memory. In addition, the Capture module 211, the Apply module 213, and the OFB 215 can all be embedded or integrated in a single controller.

The Capture module 211 and the Apply module 213 work together to provide the source transactions indicated by the log records 207 to the OFB 215. For example, the Capture module is configured to extract the source transactions from the log records 207 provided by the source DBMS 202 and determines the updates that should be added to tables in 232. The Apply module 213 is configured to receive the extracted source transactions 212 from the Capture module 211 and to generate a parallel feed of independent batches of transactions 214. The batch transactions 214 can include a combination of very small and very large transactions that are processed according to individual row dependencies and optimizes batch size to respect both transactional integrity and end-to-end replication latency objectives. Accordingly, batches can bundle together inserts/deletes into one of many concurrent OTF builder tables. This allows the computing system 200 can generate multiple threads that are concurrently and safely build separate files. In one or more non-limiting embodiments that batches of transactions 214 can be re-ordered to resolve transaction dependency, achieve largest possible lakehouse transaction size, and meet real-time, or near real-time, latency objective.

The Apply module 213 is further configured to perform dependency analysis of concurrent transactions among the extracted source transactions 212 so that they can be independently batched, re-ordered safely and with resilience, and delivered in parallel as the re-ordered transactions 214 to the OFB 215. For example, the dependency analysis can be used to assure that writes to the same data row are capture in the same batch and are not put in separate batches which would lead to transactional inconsistency.

The OFB 215 operates to translate data format types and construct tables between the source DBMS 202 and the data lakehouse 220. According to a non-limiting embodiment, the OFB 215 is configured to obtain the batched updates from the Apply module 213 and construct one or more open format files 216 (e.g., Apache Parquet) indicating the changes in the source transaction tables 204. The OFB 215 can further add timestamp data into the open format files 216. For example, the OFB 215 can add the timestamp data by creating a new column in the source transaction tables 204 and inputting the timestamp data into the new column. By introducing a timestamp for each row streamed into the lakehouse, time-based queries are possible, e.g., "provide the account balance for customer X on a given date and time." One instance of the OFB may introduce additional columns in the output data such as source DBMS client ID.

In addition, the OFB 215 determines metadata included in the open format files 216 and delivers transactions indicating the metadata to the data lakehouse 220 (i.e., OTF server 226). According to a non-limiting embodiment, the OFB 215 sends OFB-file locations to a server, e.g., the OTF server 226. The OTF server 226 then reads some parts of the OFB files to extract certain file metadata to update the target table. To avoid redundant reads/writes to object store, the computing system removes a redundant read from object store, and the OFB 215 extracts relevant metadata from files during file creation time. Instead of sending just file locations to the OTF server 226, the OFB 215 sends file locations and relevant metadata for all files. As a result, OTF server 226 does not need to read the files from the Object store 222 ever, saving one trip to Object store 222. After extracting the metadata, the OFB 215 delivers the open data format files (e.g., Parquet files) to storage in the lakehouse 220. According to a non-limiting embodiment, the OFB 215 optimizes a distribution of rows from one or more of the re-ordered transactions 214 into the open format files 216.

In some embodiments where the source database contains large statements (e.g., a data analytics system) and inserts from staging tables or external table files, the replication process optimistically streams the transaction before it is known if it will commit or rollback. The OFB 215 provides an interface for accepting rows for a transaction and buffers them in memory until it receives the timestamp (when the commit from the source is received by the Apply module 213) and can close the open data files and complete an OTF transaction 217, e.g., a lakehouse transaction. An OTF transaction 217 can be viewed as the data output by the OTF server 226.

According to a non-limiting embodiment, the replication service 210 performs a transaction dependency analysis across transactions to determine how to successfully batch transactions without incurring errors. For example, two source database transactions are dependent if they change a row in common. More specifically, a row is uniquely identified using one or more columns that are defined as the replication key. If two transactions update the same row (i.e., with the same replication key) at different times, they cannot be batched in the same file because multiple values for that row would be visible to a query. Hence, to preserve the entire transaction history from the source DBMS 202, source transactions containing dependent rows must be applied to the data lakehouse 220 such that each OTF transaction 217 preserves access to all committed data in the source DBMS 202.

In addition to considering dependencies, batching must consider latency objectives, adjusting the number of rows in a batch to attain end-to-end latency objectives (typically sub-second or a few seconds at the most). The criteria utilized by the OFB 215 when performing batching for preserving a source validity range includes: (1) a batch e.g., a lakehouse transaction or transaction on the lakehouse metadata such as an OTF transaction 217) contains only complete fully committed source database transaction(s); (2) transactions that change the same row cannot be batched unless the requirement for the original commit validity range is lifted and replaced by a validity range based on source database point-in-time consistency; and (3) the Apply module 213 cannot wait for a batch to be completed and must respect the latency objective.

The data lakehouse 220 determines DBMS row changes in a given source transaction table 204 based on the open format files 216 and metadata. The data lakehouse 220 includes an object storage unit 222, an open table format (OTF) server 226, and a metadata store 230 (e.g., a metadata storage unit). The object storage is configured to store the open format files 216 received from the OFB 215. The OTF server 226 the Capture module 211, the Apply module 213, and the OFB 215 can be constructed as an electronic hardware controller that includes memory and a processor configured to execute algorithms and computer-readable program instructions stored in the memory.

The OTF server 226 is configured to receive the OTF transactions 217 from the OFB 215 and extract the metadata from the OTF transactions 217. In one or more non-limiting embodiments, additional metadata is sent along with the OTF 217. Based on the metadata, the OTF server 226 generates metadata files 231 and lakehouse tables 232 based on the metadata, delivers the metadata files 231 to the object storage unit 222, and delivers the lakehouse tables 232 to the metadata store 230.

The metadata store (e.g., Hive) serves as a central data repository for storing data related to data sources, processes, and schemas. For example, the metadata store 230 is configured to receive the metadata from the OTF server 226, and logically associates the lakehouse tables 232 to the OFB files 216 and the metadata files 231 stored in the object storage unit 222. According to a non-limiting embodiment, the lakehouse tables 232 store a listing of pointers (e.g., full qualified object names) that point to the open format files 216 and/or the metadata files 231 stored in the object storage unit 222. The metadata stored in the metadata store 230 further includes timestamp data, which indicates the state of the source transaction tables 204 at a given timestamp. Accordingly, the OTF server 226 can modify the lakehouse tables 232 to construct and issue data lakehouse transactions.

The full data from an existing source transaction table 204 in the source DBMS 202 generally needs to first be loaded into the data lakehouse 220 before incremental changes are propagated. The initial load must be done without requiring "stopping" the source DBMS 202. While the data is being loaded, changes continue and must be saved for later replay, transactional consistency must be restored after the backlog of changes is applied.

Often times, the source DBMS 202 contains very large tables, often containing billions of rows. To minimize memory and space requirements and maximize bandwidth, all the data is streamed to the target. While the existing rows are being copied into the data lakehouse 220, new changes are Captured in the recovery log 206 and saved in persistent storage for replay once the load is done. Because the initial copy is over inconsistent data, the catchup method must implement conflict resolution to guarantee convergence.

The initial rows have the timestamp for effective time as of the initial load time, or when available as per the row change timestamp of the source DBMS 202, or as per an existing timestamp-based transaction control column in the source DBMS 202. In another embodiment, a user provides the timestamp to use.

When copying data while it is being updated, the copy might contain rows that by the time the load completes have been deleted, updated, or even deleted and re-inserted. When applying the backlog of changes, race conditions must be considered. For example, assume a row was updated and then deleted while the source table was being read. When the reading process reads the range of the table that contained that row, the row is already gone and therefore at the target, the row does not exist. When applying the backlog of accumulated changes Captured from the recovery log during the initial load, the Apply module 213 will see the update, but it is not known if the row was copied or not into the target database. In traditional relational database replication, update would be marked as "failed, indicate a 'row not found', and then transform the update into an insert. However, when the target is a data lakehouse, updates are always decomposed to delete/insert by the replication service 202 because data lakehouse does not use in-place updates to achieve transactional guarantee. Accordingly, the computing system 200 ensures that a transaction will either fully commit or, in the event of a failure, not commit at all.

During the initial load, the row changes for the table are spilled (temporarily written to) into ordered queues in persistent storage, with one queue per source table being concurrently loaded. The backlog of changes in one queue is applied to the target table by a spill Agent once the load is complete. The changes spilled for each table may come from multiple source database transactions and a row can be changed more than once. The spill Agent must ensure that a single OTF transaction 217 does not contain multiple changes to the same row. This is achieved by the spill Agent by generating key hashes for the rows applied in each inflight OTF transaction 217 and using that hash value to detect when a spilled change is for a row that is already included in an inflight OTF transaction 217. When a second change to the row is detected, the spill Agent commits the OTF transaction 217 and starts a new OTF transaction 217.

An OFB transaction as described herein includes a batch of log records 207 indicating corresponding source database transactions streamed from the source DBMS 202 to the Capture module 211. An OFB transactions can occur when the in-memory open format table (e.g., Arrow) are written out to an open format file, which are then passed either one row at a time or in batches of multiple rows by the Apply component to the OFB 215 for propagation into the data lakehouse 220. Each row of the transaction is replicated with the source database transaction commit time and other relevant governance and lineage information (e.g., user id) so that the source data generation time for each row and its origin information is preserved. Only complete source database transactions are applied to the data lakehouse 220.

According to a non-limiting embodiment, transaction initiation signal (TxBegin) is initiated by the Apply module 213, which initiates the OFB 215 to initiate an OFB transaction 214, followed by a series of one or more row changes (insert/deletes). When a TxCommit is received, the OFB 215 flushes the in-memory construct table to generate an open data format file. The transaction is finalized with TxCommit signal or failed with TxRollback signal. In a non-limiting embodiment, transactions can be streamed for which case rows are passed in a continuous flow until a TxCommit signal or TxRollback signal is received. At this point, the timestamp is known and in the case of a commit, the transaction can be completed.

An OFB transaction includes inserts and deletes. An update from the DBMS is decomposed into a delete followed by an insert. This is required because update in-place in a data lakehouse are unavailable (recall that the data is immutable to preserve history). There is also no mechanism for detecting conflicts when doing an update, a delete followed by an insert, for applying updates guarantees data validity for specific point in time. Both the delete and insert operation (of an update operation) can be part of the same OFB transaction 217 as delete of a row are applied to all previous commits/snapshots and insert applies to the current transaction. Because the OTF server 226 cannot deal with multiple changes to the same row within an OTF transaction 217, the Apply module 213 detects multiple changes to the same row within a transaction and only passes the outcome for that row.

For a single transaction, the OFB 215 creates an open data file for each target table. Furthermore, the OFB 215 may choose to split the data for a single table across multiple open data files, which be used to limit the memory consumed by intermediary results. In the case of a batch ingest where the timestamp is not known until commit, the timestamps within the corresponding open data files are updated.

In at least one embodiment, the computing system 200 utilizes a high-performance bottom-up ingest process. For example, the ingest process performed by the computing system 200 does not use a SQL layer on the data lakehouse 220 because the SQL engine would introduce significant overhead that limits achievable performance. Instead, the OFB 215 bypasses the SQL engine and directly writes into open data files that can be readily "attached" to the open format tables generated by the OTF server 226. This direct file-writing approach is made possible due to the open data format and the fact that conflict resolution is done at the application level and not at the database level.

When the OFB 215 has finalized the construction of the open data files 216, the open format data files 216 can be copied to the object storage unit 222 or some other scale-out storage solution. As described herein, the open format table metadata maintains "pointers" to these file, and updates to the metadata are fully atomic, i.e., are automatically updated by the metadata store 230. In another embodiment, the OFB can write open format data files directly to the object storage unit 222 or some other scale-out storage solution.

According to a non-limiting embodiment, the computing system 200 can handle mismatches between the OLTP transactions and the OTF transactions 217. Conventional database replication replays transactions from a source database onto a target database to maintain transactional integrity, by using multiple parallel Agents that apply independent transactions in parallel after dependency analysis. The computing system 200, however, does not scale for streaming OLTP workloads into the data lakehouse 220 that is designed for OLAP, where each transaction requires metadata update in the object storage unit 222 that could be replicated across geo-distributed sites. To overcome the performance limitations of transactions into the data lakehouse 220, multiple relational database transactions are grouped into a single transaction 217.

As described herein, the computing system 200 can perform time-based queries based on the timestamps added for each row streamed into the data lakehouse 220. Conventional systems that use Open Table Format data do not support fine-grained time-travel, only "snapshot" level, that is, the state of the database for a given snapshot can be retrieved. However, the computing system 200 overcomes the limitation of conventional systems by combining both the snapshot-level timestamp (which contains the range of source transaction timestamp) and individual row-level source timestamps (i.e., the source transaction timestamps are copied in a new column in the target table).

According to a non-limiting embodiment, an OTF transaction 217 (e.g., a lakehouse transaction) can be processed as several commits/snapshots. Generally, a commit/snapshot can perform both inserts and deletes together. Hence, an OFB transaction (e.g., a Tx open format file) containing both inserts and deletes can be batched together in a commit/snapshot (TxC1). While this works for time-travel at OTF snapshot-granularity, it is not enough to achieve time-travel based on source timestamps. This is a result of how data lakehouse 220 deletes records. While the OFB 215 can insert source transaction timestamp for each record added to a table, a lakehouse delete operation does not involve physically deleting a row. It merely adds a filter which ignores the records that match the delete-criteria (replication keys, in our case). Since no record is added corresponding to a delete operation, the data lakehouse provides no way to associate a source-timestamp to a delete operation. To resolve this issue, in addition to the original batched OTF commit, the OFB 215 creates another commit (TxC2) that inserts a record corresponding to each delete operation in the transaction. Each delete record contains the corresponding replication keys, the source timestamp of the delete operation, and a flag (represented as an additional column in the table) that distinguishes it from the rows added by the insert operation of Tx. The TxC2 is applied before TxC1 in the OTF server 226. It should be noted that the lakehouse delete operation in TxC1 will delete both old inserts as well as the delete-records added in TxC2. Hence, the table snapshot at TxC1 only consists of the desired updated records, without any delete and/or old inserts. As a result, an OTF-level snapshot granularity can be maintained by time-traveling at Tx granularity.

To fetch the status of the table at a source-time (ti) that falls in Tx's source timestamp range, the table is rolled-back to TxC2. The table at TxC2 includes both old-insert records as well as delete records added because of Tx. The table is processed to filter out all rows that have a delete source-timestamp less than or equal to ti. Then, all records from TxC1 that have an insert source-timestamp less than or equal to ti are added to the result. Accordingly, the desired table state at source timestamp ti is obtained. It is also noted that the order of OTF commits affects the final state of the table, and they must be applied in the same order as the source. Accordingly, an analysis is performed between transactions and any two batches where a row is inserted in one batch and deleted in another batch must be applied in source commit order.

To provide fine-grained time travel, each open format table is augmented with two additional implicit columns, one containing the source database commit timestamp and the other differentiating between insert and delete records. Accordingly, use-cases that require a complete per-row time range (valid-from, valid-to) require post-processing. Accordingly, the computing system 200 leverages a compaction process supported in lakehouse to compute and populate the valid-to values. For example, the lifetime of a row can be retroactively calculated and updated by identifying the corresponding update/delete operation on the same row. Hence, during the compaction process, the replication keys of rows are identified and indexed in memory. When a row with the same replication key is encountered again, the valid-to-timestamp column for the original row is updated with the source timestamp of the row with the same replication key.

In another embodiment, where two OTF commits per OFB transaction are not desired, one can use an auxiliary OTF table, e.g., a delete table (TBLD). The delete records inserted in the main table (TBL) in TxC2 in the above example, are instead added to TBLD. The TBLD is maintained such that at any snapshot, the only delete records visible are the ones that are added in that snapshot. This removes the extra commit (TxC2) from the main table (TBL). In this case, to fetch the status of the TBL at a source-time (ti) that falls in Tx's source timestamp range, the TBL is rolled back to the last commit before Tx. All rows in the TBL that have a delete source-timestamp less than or equal to ti in TBLD at Tx are filtered out. Then, all records from the TBL at Tx that have an insert source-timestamp less than or equal to ti are added to the result. Accordingly, the desired table state at source timestamp ti is obtained. This approach removes the need of an extra OTF commit for each OFB transaction and does not need an additional implicit column to differentiate between insert and delete records. However, it involves the complexity of maintaining additional table, keeping both tables synchronized with one another, and ensuring atomicity across the two tables.

The computing system 200 also provides transaction consistency with durability and resiliency in case of component failures. For example, the computing system 200 enhances Atomicity, Consistency, Isolation, and Durability (ACID) properties by providing "exactly-once" semantics so that on failures, committed transactions that are already applied to the data lakehouse 220 but not acknowledged to the Apply module 213 are not added again. Persistence facilitated by exactly-once" semantics is present in many parts of the replication service 210.

Firstly, the Capture module 211 relies on source database recovery logs. If changes are lost along the replication process path, it is possible to read the recovery logs 206 again and re-apply those changes and obtain an idempotent result at the data lakehouse 220. This process is possible because a mechanism allows the exact determination of what has been successfully committed into the data lakehouse 220. The source transaction timestamps are preserved in the target lakehouse table 232 and the range of all the source timestamps is recorded in the commit record of OTF transactions 217. Secondly, changes Captured from the database recovery logs 206 are persisted in message queues that preserve the source commit order.

The computing system 200 also provides a failure recovery feature. According to an embodiment, if the Apply module 213 or the OTF server 226 fails, it is possible to restart applying database transactions and restore transactional integrity in the data lakehouse 220. The replication process uses a queue of transactions to apply to the data lakehouse 220 via the OFB 215. In this manner, the replication service 210 can keep track of what has already been processed and committed into the data lakehouse 220.

In one embodiment, the Apply module 213 uses a table in a persistent store (e.g., a database table) to keep track of transactions processed from the ordered queue (e.g., the DBMS transaction queue) of the source DBMS 202, and keep track of the transactions that have already been delivered and committed to the data lakehouse 220. This table, referred to as a "DONEMSG table", contains message identifiers that correspond to source database transactions 212.

Once a transaction has been fully committed into the data lakehouse 220, a separate pruning thread deletes the message identifiers from the DONEMSG table and deletes the messages from the DBMS transaction queue.

The Apply module 213 uses another database table, referred to an "INFLIGHT_TRANSACTION table" to track in-flight transactions. When starting a OFB transaction with TxBegin and feeding rows to the OFB 215, the message identifiers of the source transactions 212 and the transaction identifier provided by the OFB 215 are inserted into the INFLIGHT_TRANSACTION table. Once the TxCommit returns successfully, the message identifiers of the OFB transaction are moved from the INFLIGHT_TRANSACTION table into the DONEMSG table to indicate they are already applied and can be subsequently cleaned up by the prune thread.

In event of a crash/failure, any transaction that is still in the INFLIGHT_TRANSACTION table indicates an "in-doubt transaction", which may or may not have committed to the data lakehouse 220. During crash recovery, the Apply module 213 queries the OFB 215 with the transaction identifiers from the INFLIGHT_TRANSACTION table to find if the in-doubt transactions were committed or not. If the OFB 215 indicates that a transaction was committed, then Apply module 213 moves its information from the INFLIGHT_TRANSACTION table to the DONEMSG table so that they do not get applied again. Whereas, if the OTF server 226 indicates a transaction was not committed or partially applied, then the Apply module 213 cancels the transaction and discards it from the INFLIGHT_TRANSACTION table so that it can be subsequently read again from the ordered source transaction queue and resubmitted to the OFB 215.

According to an embodiment, the computing system 200 can perform a recovery process for in-doubt transactions. For example, updates to the data lakehouse 220 are processed via multiple stages: (1) Apply module 213 processing (e.g., initiating OFB transaction batching 214; (2) OFB local file processing (e.g., generation of OFB files 216); (3) OTF commit processing (e.g., committing transactions 217 into the data lakehouse 220; (4) metadata store 230 update processing; (5) relocating data to the object storage unit 222; and OTF atomic update processing. Update processing through each stage can fail thus requiring failure handling. According to a non-limiting embodiment, all the local and remote changes are dropped (e.g., delete open data files) and then the uncommitted log is replayed. In this example, a partial "catch-up" scheme can also be applied. In this case, during crash recovery, the Apply module 213 communicates with the OFB 215 to retrieve a list of committed transactions among the submitted OTF transactions 217 (e.g., the OFB transactions 214 that the Apply module 213 has initiated but not received the completion/committed responses for) and updates the INDOUBT transactions. All committed transactions that are part of the last OTF snapshot are moved into the DONEMSG table. All incomplete transactions are discarded from the INFLIGHT_TRANSACTION TABLE, canceled, and then re-executed.

To determine a transaction status, the OTF server 226 scans the entire commit history to search for transaction IDs and return the statuses to the Apply module 213. The Apply module 213 then uses this information to skip already completed but not acknowledged transactions and re-execute all uncommitted transactions.

Figure 3:
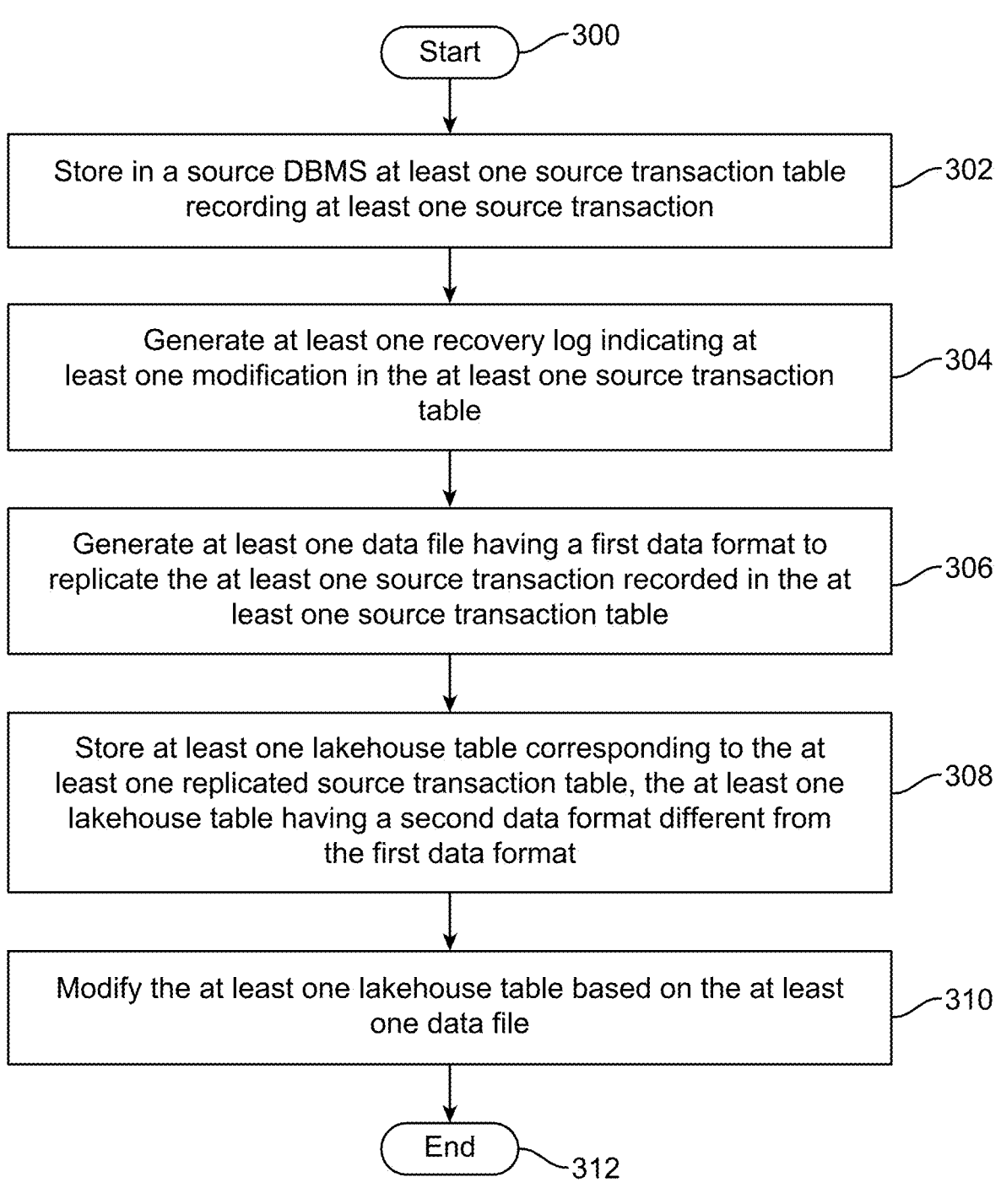
FIG. 3 is a flow diagram illustrating a computer-implemented method of performing real-time replication of database management system transactions into a data lakehouse is provided.

Turning now to FIG. 3, a computer-implemented method of performing real-time replication of database management system transactions into a data lakehouse is illustrated according to a non-limiting embodiment of the present disclosure. The method begins at operation 300, and at operation 302 stores in a source DBMS at least one source transaction table recording at least one source transaction. At operation 304, at least one recovery log is generated, which indicates at least one modification in the at least one source transaction table. At operation 306, at least one data file is generated, which has a first data format to replicate the at least one source transaction recorded in the at least one source transaction table. At operation 308, at least one lakehouse table corresponding to the at least one replicated source transaction table is stored in a data lakehouse. The at least one lakehouse table has a second data format different from the first data format. At operation 310, the at least one lakehouse table is modified based on the at least one data file, and the method ends at operation 312.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computing system configured to perform real-time replication of database management system transactions, the computing system comprising:

a source database management system (DBMS) configured to store at least one source transaction table recording at least one source transaction and to generate at least one recovery log indicating at least one modification in the at least one source transaction table;

a replication service in signal communication with the source DBMS, the replication service including a first controller configured to replicate the at least one source transaction recorded in the at least one source transaction table by generating at least one data file having a first data format;

a data lakehouse in signal communication with the replication service, the data lakehouse including a second controller configured to store at least one lakehouse table corresponding to the at least one source transaction table and having a second data format different from the first data format, and to modify the at least one lakehouse table based on the at least one data file, wherein the replication service propagates the at least one source transaction into the data lakehouse based on the at least one data file to generate at least one propagated source transaction; and wherein the data lakehouse generates the at least one lakehouse table including pointer that points to the at least one propagated source transaction propagated in the data lakehouse.

2. The computing system of claim 1, wherein:

the replication service comprises an open format builder (OFB) configured to determine metadata corresponding to the at least one source transaction and to generate the at least one data file having an open data format; and the data lakehouse comprises an open table format (OTF) server configured to receive the metadata from the OFB and to modify the at least one lakehouse table based on the metadata.

3. The computing system of claim 2, wherein the replication service further comprises:
   a Capture module configured to extract the at least one source transaction from the at least one recovery log;
   an Apply module configured to receive the extracted at least one source transaction from the Capture module and to generate a parallel feed of independent batches of transactions corresponding to the at least one source transaction.

4. The computing system of claim 3, wherein the OFB is configured to determine at least one DBMS row change in the source transaction table associated based on the batches of transactions and to construct the at least one data file having the open data format indicating at least one row change in the source transaction table.

5. The computing system of claim 4, wherein the OFB adds timestamp data into the at least one data file having open data format.

6. The computing system of claim 5, wherein adding the timestamp data includes creating a new column in the at least one source transaction table and inputting the timestamp data into the new column.

7. The computing system of claim 4, wherein the data lakehouse further comprises:
   an object storage unit configured to store the at least one data file having the open data format; and
   a metadata store configured to store the at least one lakehouse table.

8. The computing system of claim 7, wherein the metadata is stored in the at least one lakehouse table as listing pointers that point to the at least one data file stored in the object storage unit.

9. A computer-implemented method of performing real-time replication of database management system transactions into a data lakehouse, the method comprising:
   storing in a source database management system (DBMS) at least one source transaction table recording at least one source transaction;
   generating at least one recovery log indicating at least one modification in the at least one source transaction table;
   generating at least one data file having a first data format to replicate the at least one source transaction recorded in the at least one source transaction table;
   propagating the at least one source transaction into the data lakehouse based on the at least one data file to generate at least one propagated source transaction;
   generating at least one lakehouse table including pointer that points to the at least one propagated source transaction propagated in the data lakehouse, the at least one lakehouse table corresponding to the at least one replicated source transaction table and having a second data format different from the first data format, and storing at least one lakehouse table in the data lakehouse; and
   modifying the at least one lakehouse table based on the at least one data file.

10. The computer-implemented method of claim 9, further comprising:
   determining by an open format builder (OFB) metadata corresponding to the at least one source transaction and to generate the at least one data file having an open data format;

receiving by an open table format (OTF) server the metadata from the OFB; and
modifying the at least one lakehouse table based on the metadata.

11. The computer-implemented method of claim 10, further comprising:
   extracting by a Capture module c the at least one source transaction from the at least one recovery log;
   receiving by an Apply module the extracted at least one source transaction from the Capture module; and
   generating by the Apply module a parallel feed of independent batches of transactions corresponding to the at least one source transaction.

12. The computer-implemented method of claim 11, further comprising:
   determining by the OFB at least one DBMS row change in the source transaction table associated based on the batches of transactions; and
   constructing the at least one data file having the open data format indicating at least one row change in the source transaction table.

13. The computer-implemented method of claim 12, further comprising adding timestamp data into the at least one data file having the open data format.

14. The computer-implemented method of claim 13, wherein adding the timestamp data includes creating a new column in the at least one source transaction table and inputting the timestamp data into the new column.

15. The computer-implemented method of claim 12, further comprising:
   storing the at least one data file having the open data format in an object storage unit; and
   storing the at least one lakehouse table in a metadata store.

16. The computer-implemented method of claim 15, wherein the metadata is stored in the at least one lakehouse table as listing pointers that point to the at least one data file stored in the object storage unit.

17. A computer program product comprising a computer readable storage medium having program instructions embodied therewith, the program instructions executable by a processor to cause the processor to perform operations comprising:
   storing in a source database management system (DBMS) at least one source transaction table recording at least one source transaction;
   generating at least one recovery log indicating at least one modification in the at least one source transaction table;
   generating at least one data file having a first data format to replicate the at least one source transaction recorded in the at least one source transaction table;
   propagating the at least one source transaction into the data lakehouse based on the at least one data file to generate at least one propagated source transaction;
   generating at least one lakehouse table including pointer that points to the at least one propagated source transaction propagated in the data lakehouse, the at least one lakehouse table corresponding to the at least one replicated source transaction table and having a second data format different from the first data format, and storing at least one lakehouse table in the data lakehouse; and
   modifying the at least one lakehouse table based on the at least one data file.

18. The computer program product of claim 17, further comprising:

determining by an open format builder (OFB) metadata corresponding to the at least one source transaction and to generate the at least one data file having an open data format;

receiving by an open table format (OTF) server the metadata from the OFB; and modifying the at least one lakehouse table based on the metadata.

19. The computer program product of claim 18, further comprising:

extracting by a Capture module c the at least one source transaction from the at least one recovery log;

receiving by an Apply module the extracted at least one source transaction from the Capture module; and generating by the Apply module a parallel feed of independent batches of transactions corresponding to the at least one source transaction.

20. The computer program product of claim 19, further comprising:

determining by the OFB at least one DBMS row change in the source transaction table associated based on the batches of transactions; and constructing the at least one data file having the open data format indicating at least one row change in the source transaction table.

* * * * *